(12) United States Patent
Bernhard et al.

(10) Patent No.: US 7,650,809 B2
(45) Date of Patent: Jan. 26, 2010

(54) ELECTRICAL STEERING DEVICE FOR MOTOR VEHICLES

(75) Inventors: Werner Bernhard, Mögglingen (DE); Friedrich Mayr, Ostflidern (DE); Michael Jüschke, Spraitbach (DE); Erich Berroth, Birkenlohe (DE); Marc Kohler, Donaueschingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 634 days.

(21) Appl. No.: 10/416,590

(22) PCT Filed: Oct. 30, 2001

(86) PCT No.: PCT/EP01/12503
§ 371 (c)(1), (2), (4) Date: Oct. 14, 2003

(87) PCT Pub. No.: WO02/38432
PCT Pub. Date: May 16, 2002

(65) Prior Publication Data
US 2004/0060379 A1 Apr. 1, 2004

(30) Foreign Application Priority Data
Nov. 13, 2000 (DE) .............................. 100 56 133

(51) Int. Cl.
F16H 57/00 (2006.01)
F16H 1/16 (2006.01)
F16H 1/20 (2006.01)
F16H 35/00 (2006.01)

(52) U.S. Cl. ................. 74/411; 74/425; 74/388 PS
(58) Field of Classification Search ............ 74/388 PS, 74/411, 425, 409, 406, 89.17
See application file for complete search history.

(56) References Cited

U.S. PATENT DOCUMENTS

| | | | | | |
|---|---|---|---|---|---|
| 4,862,366 | A | * | 8/1989 | Morishita et al. | 701/43 |
| 5,943,913 | A | * | 8/1999 | Fenelon | 74/411 |
| 5,956,998 | A | * | 9/1999 | Fenelon | 74/89.17 |
| 6,169,346 | B1 | * | 1/2001 | Nakamura et al. | 310/75 D |
| 6,393,929 | B1 | * | 5/2002 | Quere et al. | 74/411 |
| 6,460,650 | B2 | * | 10/2002 | Tsuboi et al. | 180/444 |
| 6,463,829 | B2 | * | 10/2002 | Torii et al. | 74/606 R |

FOREIGN PATENT DOCUMENTS

| | | |
|---|---|---|
| DE | 197 52 075 | 5/1999 |
| DE | 199 07 269 | 8/2000 |
| WO | WO 97/43564 | 11/1997 |
| WO | WO 9743564 A2 * | 11/1997 |
| WO | 00/23313 | 4/2000 |

* cited by examiner

Primary Examiner—Thomas R Hannon
Assistant Examiner—Justin Krause
(74) Attorney, Agent, or Firm—Kenyon & Kenyon LLLP

(57) ABSTRACT

An electrical steering system for a motor vehicle, having an electric motor having a worm gear which is made up of a worm and a worm wheel, coupled to an input shaft, having a ring gear, worm wheel forming one of the two coupling parts, that are to be coupled to each other, of an elastic compensation coupling whose other coupling part is connected, rotatably fixed, to the input shaft. The two coupling parts are coupled to each other only by one or by a plurality of elastic spacers.

5 Claims, 2 Drawing Sheets

ELECTRICAL STEERING DEVICE FOR MOTOR VEHICLES

FIELD OF THE INVENTION

The present invention relates to an electrical steering system.

BACKGROUND INFORMATION

Electrical steering systems may have an input shaft, that is mechanically linked to a steering handwheel, which is used to transmit a torque required for steering wheels to be steered. An output member is mechanically connected to the wheels to be steered. An electric motor, by which an auxiliary force may be exerted directly or indirectly on the output member, is positioned on the auxiliary force steering system. The input shaft and the output member are connected to each other via a torsionally flexible member so that between the input shaft and the output member a limited twisting motion is possible. In steering systems having a rack-and-pinion gear, the output member is designed as a driving pinion, and is mechanically connected via a gear rack to the steerable wheels of a motor vehicle. The gear rack is mechanically connected to a servo motor developed as an electric motor, via a reducing gear that may be designed as a worm gear. The output member is connected to an electric motor via the worm gear. The main components of the electric motor are a rotor and a stator. The stator is fixed to the housing, and the rotor is connected to a worm shaft of the worm gear via a drive shaft.

Such an electrical steering system is described, for example, in German Published Patent Application No. 197 52 075. This electrical steering system is made up of an electrical motor-driven worm gear system in which the shaft of the worm is held elastically in the gear case. Play is provided between the worm wheel and the worm of the worm gear. The worm is supported shiftably in the axial direction, and is supported on the gear case via elastic elements. Because of this, the negative influences transmitted by the electric motor's actuating drive to the steering system may be reduced.

The electrical steering system described in German Published Patent Application No. 197 52 075 has the disadvantage that noise reduction may be achieved, but not noise suppression. Furthermore, noises appearing at the limit stop during travel are not eliminated. Constant functioning cannot be guaranteed over the entire service life, since the elastic elements will have their characteristics changed by outer influences such as temperature and dirt.

It is an object of the present invention to provide an electrical steering system which may ensure a constant functioning over its entire service life in view of the decoupling of structure-borne noise and damping of the limit stop.

SUMMARY

The foregoing object may be attained by providing an electrical steering system as described herein.

The foregoing object may be achieved by providing an axial and radial decoupling and torsion damping, e.g., by decoupling of structure-borne noise of the worm gear system from the steering spindle and the drive pinion. For this purpose, the worm wheel is arranged as a coupling part of an elastic compensation coupling, the other coupling part of which is formed as a flange which is connected, rotatably fixed, to the input shaft. The two coupling parts are coupled to each other by an elastic spacer, a specified limit stop being provided, which is achieved at a certain torque.

This may make it possible to achieve an axial and radial decoupling of the ring gear of the worm wheel from the steering spindle. The rigidity of the ring gear with respect to the input shaft is able to be changed by adjusting the contour and form of the elastic spacer.

Further aspects and features of the present invention are described below. However, the present invention is not limited to the feature combinations set forth below, but rather, further combination possibilities of features become apparent to one skilled in the art.

The present invention is described in greater detail below with reference to an exemplary embodiment represented in the drawings.

DETAILED DESCRIPTION

Figure 1:
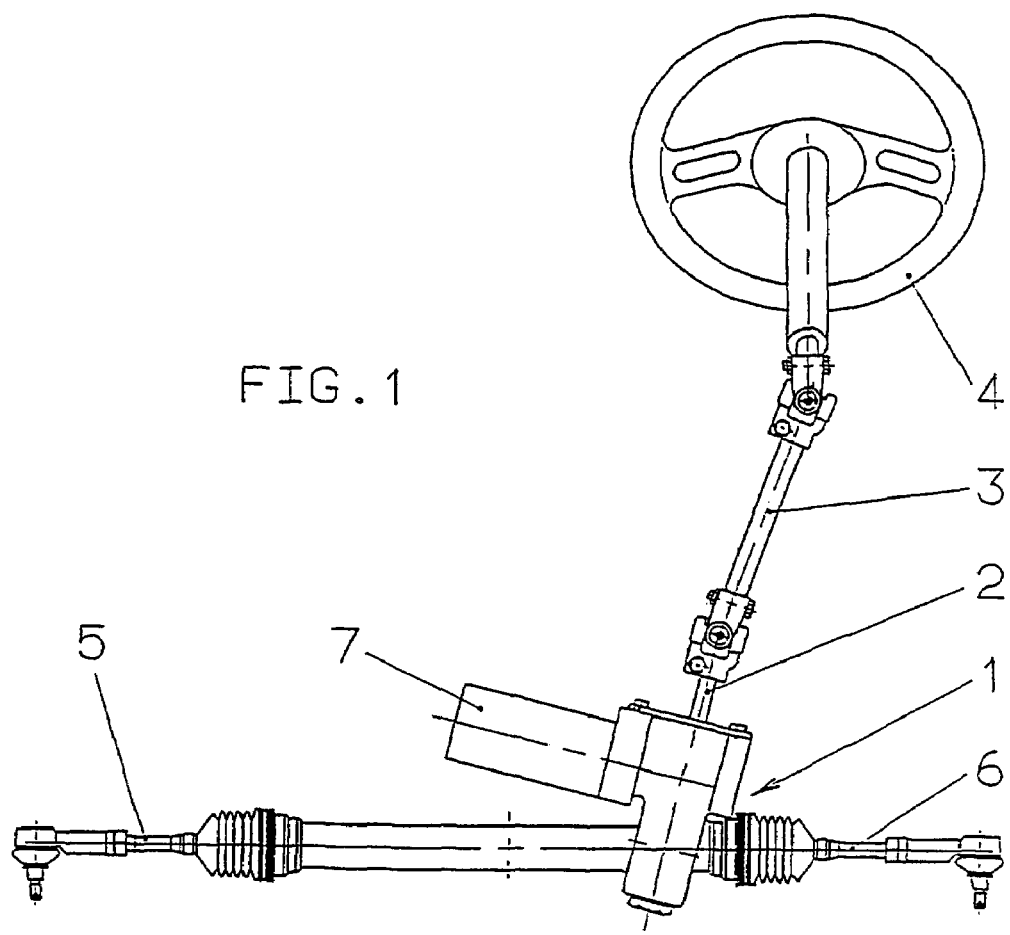
FIG. 1 illustrates the construction of an electrical steering system for motor vehicles, in a schematic representation.

In the exemplary embodiment in FIG. 1, the electrical steering system for motor vehicles includes a steering gear of a rack-and-pinion steering 1. Such a rack-and-pinion steering 1 is generally conventional, and is therefore not explained in more detail here. An input shaft 2, which is mechanically connected to a steering handwheel 4, for example, via a steering column 3 provided with universal joints, bears a drive pinion of the rack-and-pinion steering.

A gear rack of rack-and-pinion steering 1, together with two drag rods 5 and 6, form an output member which is connected mechanically to wheels to be steered. In addition, the gear rack forms the drive part of the steering system.

By the use of such a steering system, a steering torque may be transmitted from steering handwheel 4 to the wheels to be steered.

A supporting torque may be exerted on input shaft 2 by an electric motor 7. In the exemplary embodiment illustrated in FIG. 1, electric motor 7 is positioned so that its axis is located perpendicular to the axis of input shaft 2, and thus of the drive pinion. But its axis may also be positioned at a different angle to the axis of input shaft 2. At the same or similar effect, electric motor 7 may be situated so that its axis is parallel to the axis of input shaft 2, and thus also to that of the drive pinion or another part of steering column 3. In both manners of positioning electric motor 7 described so far, it acts upon input shaft 2 using the drive pinion of rack-and-pinion steering 1. Electric motor 7 may be positioned so that its axis is parallel or coaxial to the longitudinal direction of the gear rack of rack-and-pinion steering 1.

Electric motor 7 may be configured as an asynchronous motor. The asynchronous motor may be made up of a rotatable rotor 8 and a fixed winding 9. The torque is produced by a rotating field specified from the outside via control and switching elements. Rotor 8 may be configured as a squirrel-cage rotor or as a squirrel-cage induction rotor. Since such an electric motor does not require permanent magnets, no magnetic field is generated during rotation of rotor 8, when there is interference in the electrical or electronic part of the steering system, which would influence or hinder the rotary motion of rotor 8. This may ensure that the power flow from steering handwheel 4 to the steered wheels is not impaired in case of interference.

Figure 2:
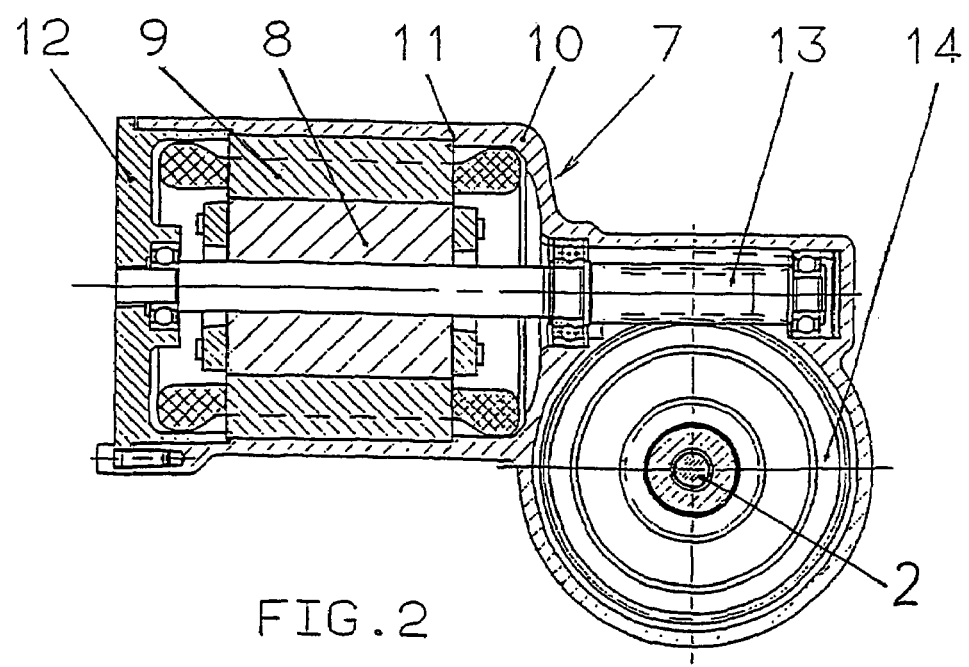
FIG. 2 is a longitudinal cross-sectional view through the electrical motor illustrated in FIG. 1.

In the exemplary embodiment illustrated in FIG. 2, winding 9 of electric motor 7 is integrated directly into a housing 10 in a space-saving manner, and is protected from axial and radial motion by a stop 11 and an axially prestressed cover 12.

The torque produced by electric motor 7 is transmitted to input shaft 2 via a worm gear system made up of worm 13 and worm wheel 14.

Figure 3:
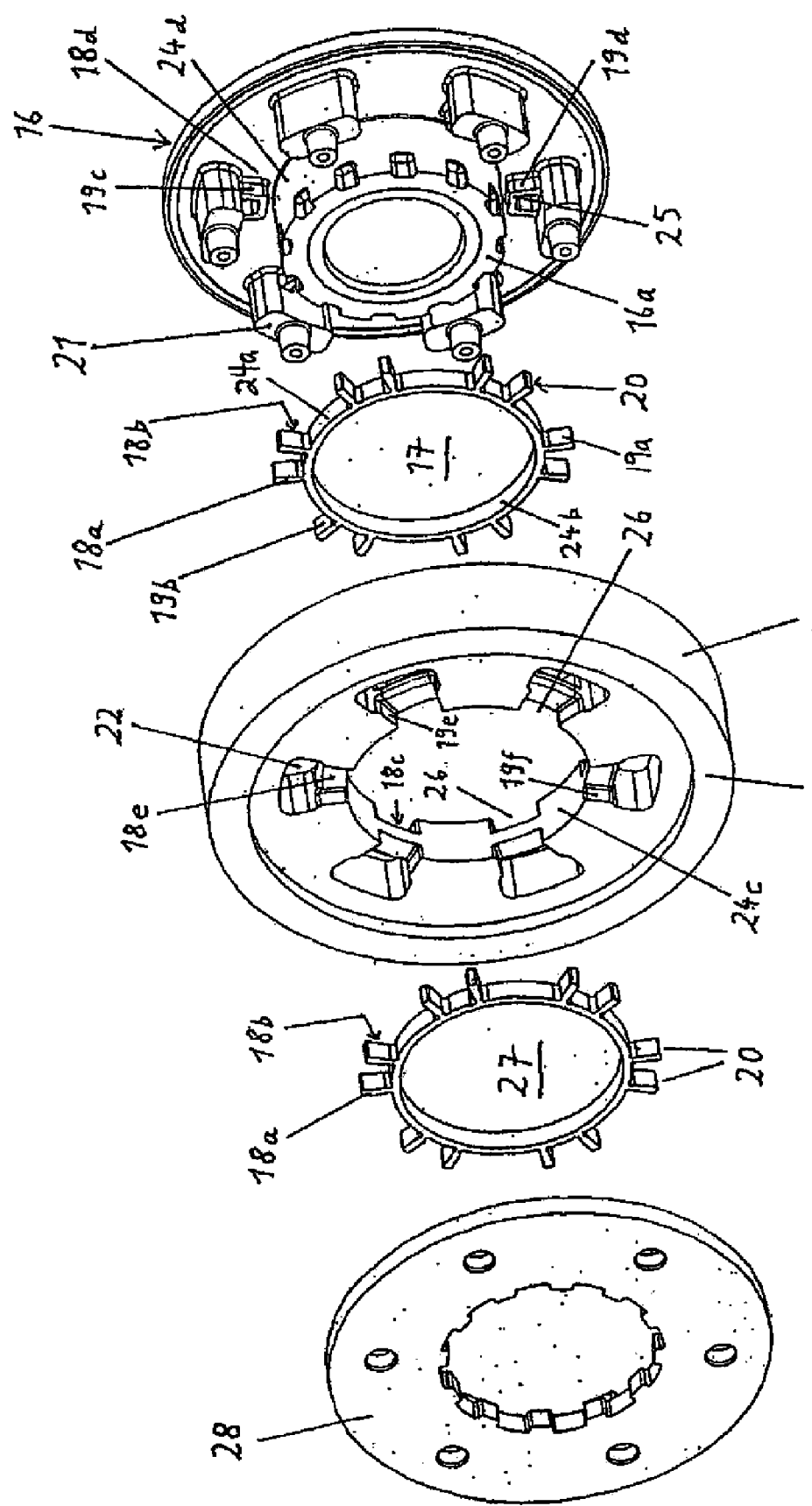
FIG. 3 is an exploded representation of the worm wheel illustrated in FIG. 2.

FIG. 3 is an exploded view of the elastic compensation coupling, of which worm wheel 14 illustrated in FIG. 2 is a part.

It has a ring gear 23, in which worm 13 (FIG. 2) engages. The other coupling part of the elastic compensation coupling, e.g., flange 16, is connected in a rotatably fixed manner to input shaft 2 (see FIGS. 1 and 2), e.g., by a connecting piece, the end face of which is marked 16*a*, and the lateral surface of which is marked 24*d*.

The two parts 14 and 16 of the compensation coupling are supplemented by a ring-shaped, elastic spacer 17 having processes 20. In the assembled state, inner surface 24*b* of spacer 17 is arranged on lateral surface 24*d* of the connecting piece of flange 16. In this context, in each case two processes 20 encompass one of lugs 25 on flange 16.

Worm wheel 14 may be arranged with mirror symmetry, and thus may have the same aspect on the non-visible reverse side as on the front. After assembly, worm wheel 14 is supported on spacer 17, which in turn is supported on the connecting piece of flange 16. Inner surface 24*c* of worm wheel 14 thus rests on ring outer surface 24*a* of spacer 17. Throat depths 26 of recesses 22 in worm wheel 14 are provided for processes 20 of spacer 17. Processes 20 find accommodation in these throat depths 26.

Although, under certain circumstances, parts 14, 16, and 17 may be sufficient for fulfilling the functions of an elastic compensation coupling, the front side of worm wheel 14 is complemented by a second spacer 27 and a second flange 28 to become an additional compensation coupling. In the assembled state, flanges 16 and 28 are connected to each other by studs 21. In addition, an inner toothing of second flange 28 engages with a toothing of the connecting piece on flange 16. In the assembled state, second elastic spacer 27 also rests on the connecting piece of flange 16. These lugs of second flange 28 project in each case into the interstice between two closely adjacent processes 20 of spacer 27.

Then, for example, front contact surface 18*a* is arranged up against the rear side of second flange 28. Rear side contact surface 18*b* of second spacer 27 is arranged up against contact surface 18*e* of a throat depth 26 in worm wheel 14. Lateral contact surfaces 19*a*, 19*b* of spacer 17 and 27 rest against lateral contact surfaces 19*c*, 19*d* of lugs 25 and lateral contact surfaces 19*e*, 19*f* of throat depths 26 in worm wheel 14.

Processes 20 thus prevent lugs 25 from directly touching the lateral surfaces of throat depths 26 during the transmission of a torque in one or the other direction. Spacers 17, 27 are also arranged so wide that they prevent direct contact of parts 14 and 26 or 14 and 28 in the axial direction. And, since the ring-shaped parts of spacers 17, 27 are arranged between lateral surface 24*d* of flange 16 and inner surface 24*c* of worm wheel 14, it is also provided in the radial direction that direct contact between the connecting piece of flange 16 and worm wheel 14 may be avoided. Spacers 17, 27 thus form buffers between flange 16 (and thereby input shaft 2) and worm wheel 14 both in the axial and the radial direction, and also in the tangential direction.

However, the elastic buffering is not unlimited in the tangential direction, because recesses 22 in worm wheel 14, through which studs 21 of flange 16 engage, are only a little larger (measured in the tangential direction) than studs 21, e.g., to provide positive clearance or backlash between the studs 21 and the recesses 22. This has the result that studs 21 and recesses 22 form mutual stops, which take effect when, during the transmission of an excessively large torque, processes 20 of spacers 17, 27 are squeezed together by a certain amount.

What is claimed is:

1. An electrical steering system for a motor vehicle, comprising:

an electric motor;

an input shaft;

a worm gear system including a worm and a worm wheel coupled to the input shaft;

an elastic compensating coupling adapted to transmit torque and including coupling parts to be coupled to each other, a first coupling part being the worm wheel and a second coupling part being a flange rotatably fixedly connected to the input shaft, wherein the elastic compensating coupling includes at least one elastic spacer arranged to space the coupling parts from each other in axial, radial and tangential directions and to couple the coupling parts to each other, at least one of (a) the first coupling part and (b) the second coupling part including contact surfaces arranged to exert axial, radial and tangential pressure forces during operation on corresponding contact surfaces of the spacer, wherein one of (a) the first coupling part and (b) the second coupling part includes at least one stud adapted to engage with axial, radial, and tangential positive clearance in a larger recess of the other one of (a) the first coupling part and (b) the second coupling part, the stud and the recess configured to form mutual limit stops at a certain torque in accordance with a corresponding elastic deformation of the spacer after overcoming the positive tangential clearance.

2. The electrical steering system according to claim 1, wherein the second coupling part includes a connecting piece arranged to support the worm wheel, the elastic spacer arranged between the second coupling part and the worm wheel.

3. An electrical steering system for a motor vehicle, comprising:

an electric motor;

an input shaft;

a worm gear system including:
 a worm; and
 a worm wheel coupled to the input shaft;

a flange rotatably fixedly connected to the input shaft; and at least one elastic spacer;

wherein the flange, the worm wheel and the elastic spacer are coupled to each other;

wherein the elastic spacer spaces the flange and the worm wheel from each other in axial, radial and tangential directions;

wherein the flange and the worm wheel include contact surfaces arranged to exert axial, radial and tangential pressure forces during operation on corresponding contact surfaces of the spacer;

wherein at least one of (a) the flange and (b) the worm wheel includes at least one stud;

wherein the other one of (a) the flange and (b) the worm wheel includes at least one recess;

wherein each stud is received in a corresponding recess with at least positive tangential clearance between the stud and tangential surfaces of the recess; and wherein the stud and the tangential surfaces of the recess form mutual limit stops that engage at a certain torque between the flange and the worm wheel after a corresponding tangential elastic deformation of the spacer.

4. The electrical steering system according to claim 3, wherein the flange includes a connecting piece arranged to support the worm wheel, the elastic spacer arranged between the flange and the worm wheel.

5. An electrical steering system for a motor vehicle, comprising:

- an electric motor;
- an input shaft;
- a worm gear system including:
  - a worm; and
  - a worm wheel coupled to the input shaft;
- a flange rotatably fixedly connected to the input shaft; and
- at least one elastic spacer;

wherein the flange, the worm wheel and the elastic spacer are coupled to each other;

wherein the elastic spacer spaces the flange and the worm wheel from each other in axial, radial and tangential directions;

wherein the flange and the worm wheel include contact surfaces arranged to exert axial, radial and tangential pressure forces during operation on corresponding contact surfaces of the spacer;

wherein at least one of (a) the flange and (b) the worm wheel includes at least one stud;

wherein the other one of (a) the flange and (b) the worm wheel includes at least one recess;

wherein each stud is received in a corresponding recess with at least tangential backlash between the stud and tangential surfaces of the recess; and wherein the stud and the tangential surfaces of the recess form mutual limit stops that engage at a certain torque between the flange and the worm wheel after a corresponding tangential elastic deformation of the spacer.

* * * * *

UNITED STATES PATENT AND TRADEMARK OFFICE
CERTIFICATE OF CORRECTION

PATENT NO. : 7,650,809 B2  
APPLICATION NO. : 10/416590  
DATED : January 26, 2010  
INVENTOR(S) : Bernhard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twenty-third Day of November, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,650,809 B2 | Page 1 of 1 |
| APPLICATION NO. | : 10/416590 | |
| DATED | : January 26, 2010 | |
| INVENTOR(S) | : B. Werner et al. | |

It is certified that error appears in the above-identified patent and that said Letters Patent is hereby corrected as shown below:

Title page Item (73) should read:

-- (73)   Assignee:   ZF LENKSYSTEME GMBH,
SCHWABISCH GMUND (DE)

IMS GEAR GMBH,
DONAUESCHINGEN (DE) --.

Signed and Sealed this
Eighteenth Day of August, 2015

Michelle K. Lee
*Director of the United States Patent and Trademark Office*